United States Patent
Kamepalli et al.

(10) Patent No.: US 11,599,149 B2
(45) Date of Patent: Mar. 7, 2023

(54) DOCKING STATION SUPPORTING POWER INPUTS FROM A DISPLAY

(71) Applicant: Dell Products, L.P., Round Rock, TX (US)

(72) Inventors: Srinivas Kamepalli, Austin, TX (US); Merle Jackson Wood, III, Round Rock, TX (US); Marcin M. Nowak, Round Rock, TX (US)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 17/395,634

(22) Filed: Aug. 6, 2021

(65) Prior Publication Data

US 2023/0039167 A1    Feb. 9, 2023

(51) Int. Cl.
| | |
|---|---|
| G06F 1/16 | (2006.01) |
| G06F 1/26 | (2006.01) |
| G06F 13/42 | (2006.01) |
| H02J 7/00 | (2006.01) |

(52) U.S. Cl.
CPC ............ *G06F 1/1632* (2013.01); *G06F 1/263* (2013.01); *G06F 1/266* (2013.01); *G06F 13/4282* (2013.01); *G06F 2213/0042* (2013.01); *H02J 7/0042* (2013.01)

(58) Field of Classification Search
CPC ........ G06F 1/1632; G06F 1/189; G06F 1/263; G06F 1/266; G06F 13/4004; G06F 13/4027; G06F 13/4282; G06F 2213/0042; H02J 7/0042
See application file for complete search history.

(56) References Cited

U.S. PATENT DOCUMENTS

| | | | | |
|---|---|---|---|---|
| 6,288,522 | B1* | 9/2001 | Odaohhara | H02J 7/00714 320/137 |
| 10,224,727 | B2* | 3/2019 | Li | H02J 7/00 |
| 10,530,108 | B2* | 1/2020 | Liu | G05B 15/02 |
| 10,673,256 | B2* | 6/2020 | Li | H02J 7/0027 |
| 2008/0222432 | A1* | 9/2008 | Gilbert | H01R 31/065 713/300 |
| 2009/0033287 | A1* | 2/2009 | Nikazm | G06F 1/263 320/137 |
| 2009/0079264 | A1* | 3/2009 | Minami | G06F 1/266 307/44 |
| 2013/0234668 | A1* | 9/2013 | Kuo | G06F 1/266 320/125 |

(Continued)

*Primary Examiner* — Thomas J. Cleary
(74) *Attorney, Agent, or Firm* — Fogarty LLP

(57) ABSTRACT

Systems and method are provided in which docking stations provide power to an Information Handling System (IHS) that is coupled to the docking station and provide the IHS with access to I/O (Input/Output) devices coupled to the docking station. Docking stations include a power circuit receiving a supply of DC power from an external power source. Docking stations also include a docking port used by the docking station to supply DC power to the docked IHS. Docking stations also include an I/O port the receives a connection from an external display, where a DC power input is received via the I/O port from the coupled external display. A controller of the docking station apportions the DC power input received from the coupled external display between operations of the docking station and the DC power supplied to the IHS via the docking port.

17 Claims, 4 Drawing Sheets

(56) References Cited

U.S. PATENT DOCUMENTS

| | | | |
|---|---|---|---|
| 2015/0160705 A1* | 6/2015 | Chen | G06F 1/26 |
| | | | 713/300 |
| 2016/0202743 A1* | 7/2016 | Li | G06F 13/4282 |
| | | | 710/313 |
| 2016/0216750 A1* | 7/2016 | Hundal | G06F 13/4068 |
| 2016/0268801 A1* | 9/2016 | Chong | H02J 1/108 |
| 2016/0352101 A1* | 12/2016 | Koo | H02J 1/102 |
| 2017/0017283 A1* | 1/2017 | Seo | G09G 5/003 |
| 2017/0046289 A1* | 2/2017 | Hundal | G06F 13/4022 |
| 2017/0220088 A1* | 8/2017 | Tan | G06F 13/4022 |
| 2017/0293334 A1* | 10/2017 | Pelissier | G06F 1/32 |
| 2018/0143934 A1* | 5/2018 | Li | G06F 13/385 |
| 2020/0081860 A1* | 3/2020 | Abdul-Razzak | G06F 1/1632 |
| 2020/0174539 A1* | 6/2020 | Lin | H05K 5/0017 |
| 2020/0348723 A1* | 11/2020 | Wood, III | G06F 1/1632 |
| 2020/0395772 A1* | 12/2020 | Hsu | G01K 3/005 |
| 2021/0048849 A1* | 2/2021 | Lee | G06F 1/1632 |
| 2021/0263576 A1* | 8/2021 | Jabori | G06F 1/263 |
| 2021/0357013 A1* | 11/2021 | Cheng | G06F 13/4282 |

\* cited by examiner

US 11,599,149 B2

DOCKING STATION SUPPORTING POWER INPUTS FROM A DISPLAY

FIELD

This disclosure relates generally to Information Handling Systems (IHSs), and more specifically, to powering IHSs.

BACKGROUND

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

A docking station may be used to support the use of a portable IHS, such as a laptop computer or a tablet, while at a workstation that is available for use at a fixed location. The docking station may support use of the portable IHS via external displays and other I/O devices such as speakers, external keyboards and a mouse. In addition, a docking station may be a source of electrical power for a portable IHS while the portable IHS is docked. A portable IHS may utilize the power provided by a docking station for powering its operations and for recharging the internal batteries of the portable IHS. In some scenarios, such as at a public workstation, a docking station may support multiple different types of portable IHSs.

SUMMARY

In various embodiments, docking stations are provided that are configured for providing power to an Information Handling System (IHS) that is coupled to the docking station and further configured for providing the IHS with access to a plurality of I/O (Input/Output) devices coupled to the docking station. Docking station embodiments may include: a power circuit receiving a supply of DC power from an external power source; a docking port used by the docking station to supply DC power to the IHS that is coupled to the docking station; an I/O port receiving a connection from an external display, wherein the I/O port receives a DC power input from the coupled external display; and a controller configured to apportion the DC power input received from the coupled external display between operations of the docking station and the DC power supplied to the IHS via the docking port.

In some docking station embodiments, the external power source providing DC power to the power circuit comprises an AC adapter. In some docking station embodiments, based on the apportionment by the controller, the DC power input received from the coupled external display is used to power operations of the docking station and the supply of DC power received from the external power source is routed to the IHS via the docking port. In some docking station embodiments, based on the apportionment by the controller, a portion of the DC power input received from the coupled external display is routed to the IHS via the docking port. In some docking station embodiments, the I/O port comprises a USB-C port. In some docking station embodiments, the AC adapter comprises a USB-C adapter. In some docking station embodiments, based on the apportionment by the controller, the DC power input received from the coupled external display is aggregated with the supply of DC power from an external power source. In some docking station embodiments, the power circuit uses the aggregated power from the external display and the external power source to generate a fixed voltage output for powering operations of the docking station and in supplying the IHS with power via the docking port. In some docking station embodiments, the power circuit uses the aggregated power from the external display and the external power source to generate variable voltage outputs for use in powering operations of the docking station and for use in supplying the IHS with power via the docking port. In some docking station embodiments, the apportionment of the power received from external display allows the docking station to supply a negotiated power output to the IHS while operating without throttling its operations.

In various additional embodiments, methods provide power to a first Information Handling System (IHS) that is coupled to a docking station. The methods may include: receiving, by the docking station, a supply of DC power from an external power source; supplying DC power to the IHS via a docking port by which the IHS is coupled to the docking station; detecting a connection from an external display at an I/O port of the docking station, wherein the I/O port receives a DC power input from the coupled external display; and apportioning, by an embedded controller of the docking station, the DC power input received from the coupled external display between operations of the docking station and the DC power supplied to the IHS via the docking port.

In some method embodiments, the external power source providing DC power to the power circuit comprises an AC adapter. In some method embodiments, based on the apportionment by the controller, the DC power input received from the coupled external display is used to power operations of the docking station and the supply of DC power received from the external power source is routed to the IHS via the docking port. In some method embodiments, based on the apportionment by the controller, a portion of the DC power input received from the coupled external display is routed to the IHS via the docking port. In some method embodiments, the I/O port comprises a USB-C port. In some method embodiments, the AC adapter comprises a USB-C adapter.

In various additional embodiments, systems are provided that may include: an Information Handling System (IHS) coupled to a docking station; and the docking station configured for providing power the coupled IHS and further configured for providing the IHS with access to a plurality of I/O (Input/Output) devices coupled to the docking station, the docking station comprising: a power circuit receiving a supply of DC power from an external power source; a docking port used by the docking station to supply DC power to the IHS that is coupled to the docking station; an I/O port receiving a connection from an external display, wherein the I/O port receives a DC power input from the coupled external display; and a controller configured to apportion the DC power input received from the coupled external display between operations of the docking station and the DC power supplied to the IHS via the docking port.

In some system embodiments, the external power source providing DC power to the power circuit comprises an AC adapter. In some system embodiments, based on the apportionment by the controller, the DC power input received from the coupled external display is used to power operations of the docking station and the supply of DC power received from the external power source is routed to the IHS via the docking port. In some system embodiments, based on the apportionment by the controller, a portion of the DC power input received from the coupled external display is routed to the IHS via the docking port.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

DETAILED DESCRIPTION

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

Figure 1:
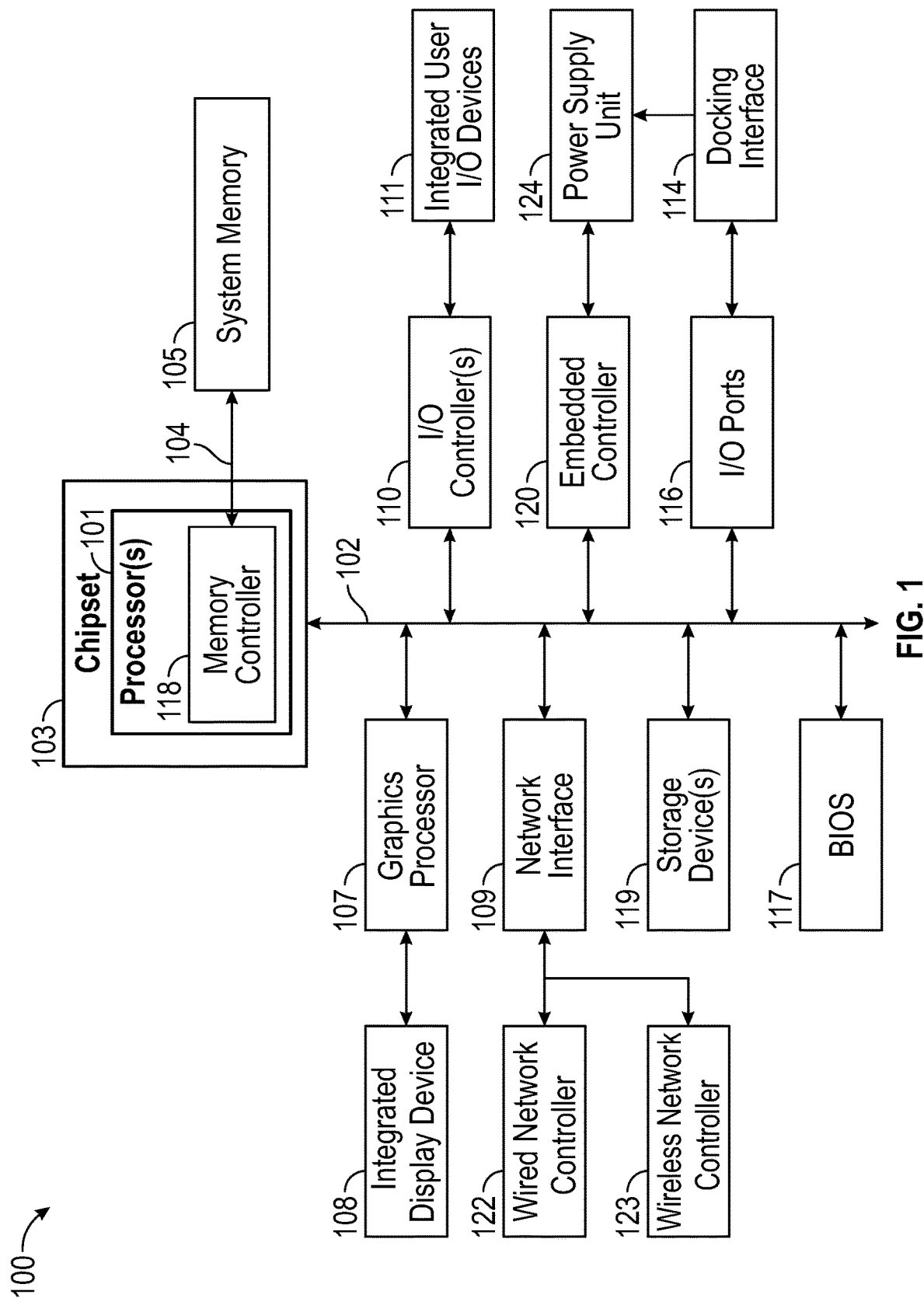
FIG. 1 is a block diagram depicting certain components of an IHS operable according to various embodiments for receipt of power inputs from a docking station that receives power from an external display that is coupled to the docking station.

FIG. 1 is a block diagram illustrating certain components of an IHS 100 configured according to certain embodiments for receipt of power inputs from a docking station that receives power from an external display that is coupled to the docking station. As described, a portable IHS may utilize a docking station from which the portable IHS may receive power and may be provided use of various I/O devices, such as external displays, printers, keyboards and mice. In certain embodiments IHS 100 may include a docking interface 114 by which the IHS 100 may receive power, receive inputs from devices coupled to the docking station and transmit outputs to these coupled devices. While a single IHS 100 is illustrated in FIG. 1, IHS 100 may be a component of an enterprise system that may include any number of additional IHSs that may also be configured in the same or similar manner to IHS 100.

IHS 100 includes one or more processors 101, such as a Central Processing Unit (CPU), that execute code retrieved from a system memory 105. Although IHS 100 is illustrated with a single processor 101, other embodiments may include two or more processors, that may each be configured identically, or to provide specialized processing functions. Processor 101 may include any processor capable of executing program instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA.

In the embodiment of FIG. 1, the processor 101 includes an integrated memory controller 118 that may be implemented directly within the circuitry of the processor 101, or the memory controller 118 may be a separate integrated circuit that is located on the same die as the processor 101. The memory controller 118 may be configured to manage the transfer of data to and from the system memory 105 of the IHS 100 via a high-speed memory interface 104.

The system memory 105 that is coupled to processor 101 provides the processor 101 with a high-speed memory that may be used in the execution of computer program instructions by the processor 101. Accordingly, system memory 105 may include memory components, such as such as static RAM (SRAM), dynamic RAM (DRAM), NAND Flash memory, suitable for supporting high-speed memory operations by the processor 101. In certain embodiments, system memory 105 may combine both persistent, non-volatile memory and volatile memory. In certain embodiments, the system memory 105 may be comprised of multiple removable memory modules.

IHS 100 utilizes a chipset 103 that may include one or more integrated circuits that are connect to processor 101. In the embodiment of FIG. 1, processor 101 is depicted as a component of chipset 103. In other embodiments, all of chipset 103, or portions of chipset 103 may be implemented directly within the integrated circuitry of the processor 101. Chipset 103 provides the processor(s) 101 with access to a variety of resources accessible via bus 102. In IHS 100, bus 102 is illustrated as a single element. Various embodiments may utilize any number of buses to provide the illustrated pathways served by bus 102.

As illustrated, a variety of resources may be coupled to the processor(s) 101 of the IHS 100 through the chipset 103. For instance, chipset 103 may be coupled to a network interface 109 that may support different types of network connectivity. In certain embodiments, IHS 100 may include one or more Network Interface Controllers (NIC), each of which may implement the hardware required for communicating via a specific networking technology, such as Wi-Fi, BLUETOOTH, Ethernet and mobile cellular networks (e.g., CDMA, TDMA, LTE). As illustrated, network interface 109 may support network connections by wired network controllers 122 and wireless network controller 123. Each network controller 122, 123 may be coupled via various buses to the chipset 103 of IHS 100 in supporting different types of network connectivity, such as the network connectivity utilized in applications of the operating system of IHS 100.

Chipset 103 may also provide access to one or more integrated display device(s) 108 via graphics processor 107. IHS 100 may also support use of one or more external displays, such as external monitors that may be coupled to IHS 100 via a docking interface 114. In certain embodiments, graphics processor 107 may be comprised within a video or graphics card or within an embedded controller installed within IHS 100. In certain embodiments, graphics processor 107 may be integrated within processor 101, such as a component of a system-on-chip. Graphics processor 107 may generate display information and provide the generated information to an integrated display device 108 coupled to IHS 100 or to an external display accessed via a docking station coupled to IHS 100 via the docking interface 114.

The integrated display devices 108 and any display devices may utilize LCD, LED, OLED, or other display technologies. In certain embodiments, the integrated display device 108 may be capable of receiving touch inputs such as via a touch controller that may be an embedded component of the display device 108 or graphics processor 107, or may be a separate component of IHS 100 accessed via bus 102. As illustrated, IHS 100 may support an integrated display device 108, such as a display integrated into a laptop, tablet, 2-in-1 convertible device, or mobile device.

Chipset 103 also provides processor 101 with access to one or more storage devices 119. In various embodiments, storage devices 119 may be integral to the IHS 100, or may be external to the IHS 100. In certain embodiments, storage device 119 may be accessed via a storage controller that may be an integrated component of the storage device. Storage device 119 may be implemented using any memory technology allowing IHS 100 to store and retrieve data. For instance, storage device 119 may be a magnetic hard disk storage drive or a solid-state storage drive. In certain embodiments, storage device 119 may be a system of storage devices, such as a cloud drive accessible via network interface 109.

As illustrated, IHS 100 also includes a BIOS (Basic Input/Output System) 117 that may be stored in a non-volatile memory accessible by chipset 103 via bus 102. Upon powering or restarting IHS 100, processor(s) 101 may utilize BIOS 117 instructions to initialize and test hardware components coupled to the IHS 100. The BIOS 117 instructions may also load an operating system for use by the IHS 100. The BIOS 117 provides an abstraction layer that allows the operating system to interface with the hardware components of the IHS 100. The Unified Extensible Firmware Interface (UEFI) was designed as a successor to BIOS. As a result, many modern IHSs utilize UEFI in addition to or instead of a BIOS. As used herein, BIOS is intended to also encompass UEFI.

In certain embodiments, chipset 103 may utilize one or more I/O controllers 110 that may each support hardware components such as integrated user I/O devices 111. For instance, I/O controller 110 may provide access to one or more integrated user I/O devices 111 such as a keyboard, touchpad, touchscreen, microphone, speakers, camera and other input and output devices that may be integrated components of IHS 100. In certain embodiments, additional user I/O devices may be supported via wireless connections supported by a wireless network controller 123 of the IHS 100.

Other components of IHS 100 may include one or more I/O ports 116 the support removeable couplings with various types of peripheral external devices. For instance, I/O 116 ports may include USB (Universal Serial Bus) ports and USB-C ports, by which a variety of external devices may be coupled to IHS 100. I/O ports 116 may include various types of ports and couplings that support connections with external devices and systems, either through temporary couplings via ports, such as USB ports, accessible to a user via the enclosure of the IHS 100, or through more permanent couplings via expansion slots provided via the motherboard or via an expansion card of IHS 100, such as PCIe slots.

In various embodiments, IHS 100 may be coupled to a docking station via an I/O port 116, such as a USB-C port, that may serve as a docking interface 114. Other embodiments may utilize other types of I/O ports as a docking interface for coupling IHS 100 to a docking station. As described, a docking station may provide IHS 100 with power via the docking interface 114. In certain embodiments, the docking interface 114 may also support data transmissions between the IHS 100 and the docking station. In certain embodiments in which the docking interface 114 is a USB-C port, IHS 100 may support power delivery via the docking interface 114 that conforms to the USB power delivery specification. As described below, a docking station according to embodiments may be configured to support power delivery to IHS 100 utilizing supplemental power inputs from an external display coupled to the docking station. As described in additional detail below, based on the availability of supplemental power inputs from the external display, the IHS 100 may negotiate routing of all external power received by the docking station to be provided for use by the IHS, while the docking station utilizes the power inputs from the external display for powering the I/O operations that it supports.

In the illustrated embodiment, IHS 100 also includes a power supply unit 124 that receives DC supply inputs used for powering IHS 100 and for charging batteries from which the IHS 100 operates. IHS 100 may include a power port to which an AC adapter may be coupled. As described, IHS 100 may also include a docking interface 114 by which power may be received by IHS 100. In such embodiments, the power received from the docking interface 114 may be provided to the power supply unit 124 for powering IHS 100 and charging its batteries.

As described in additional detail below, in certain embodiments, the docking interface 114 may support queries that are utilized by the docking station to determine the power delivery and requirements of IHS 100. In such embodiments, docking interface 114 may query the power supply unit 124 in order to determine the power transfer configurations that are supported by the IHS 100. For instance, docking interface 114 may report that IHS 100 requires power delivery according to the USB power delivery specification, or may report that IHS 100 may support power deliveries at greater power levels than are supported by the USB power delivery specification, or may report that the IHS requests delivery of all external power that is available to the docking station, such that the docking station utilizes power from an external monitor for powering its own operations.

In various embodiments, an IHS 100 does not include each of the components shown in FIG. 1. In various embodiments, an IHS 100 may include various additional components in addition to those that are shown in FIG. 1. Furthermore, some components that are represented as separate components in FIG. 1 may in certain embodiments instead be integrated with other components. For example, in certain embodiments, all or a portion of the functionality provided by the illustrated components may instead be provided by components integrated into the one or more processor(s) 101 as a systems-on-a-chip.

Figure 2:
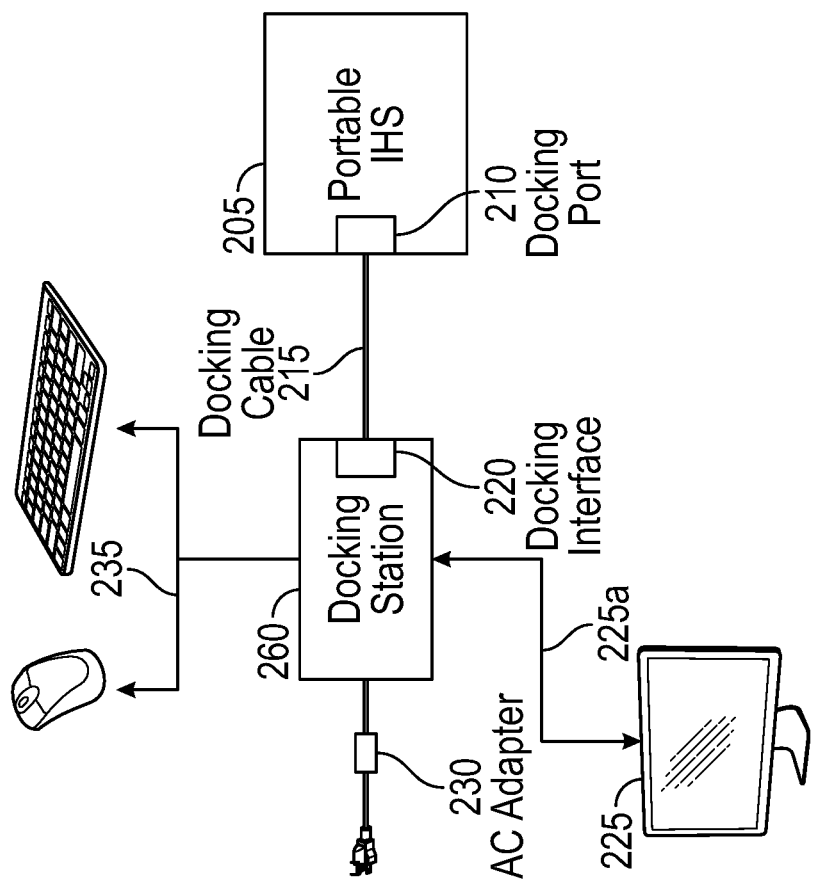
FIG. 2 is a block diagram illustrating certain components of a docking system according to some embodiments.

FIG. 2 is a block diagram illustrating certain components of a docking system according to some embodiments that includes a docking station 260 and an IHS 205. In many scenarios, an IHS 205 that utilizes a docking station 260 may be a portable IHS that may be used at various locations, including at a workstation at which docking station 260 is provided. As illustrated, a docking station 260 may provide a portable IHS 205 with use of one or more external displays 225. A docking station 260 may also provide use of various user I/O devices 235, such as a mouse and keyboard, which may be coupled to the docking station 260 via wired or wireless connections. While coupled to docking station 260, portable IHS 205 may be configured such that all user inputs and outputs generated in the operation of the portable IHS 205 are provided via docking station 260, while some or all of the user input and output capabilities of portable IHS 205 may be disabled or otherwise inoperative.

As illustrated, a portable IHS 205 may be coupled to a docking station 260 via a docking cable 215. In certain instances, the docking station 260 includes a docking interface 220 that receives one end of the docking cable 215. The portable IHS 205 includes a docking port 210 that receives the other end of the docking cable 215. Other types of docking interfaces require a mobile IHS to be plugged directly to a docking station, such as via mating of an external connector of the mobile IHS with a compatible coupling provided by the docking station, with no cables being used to connect the portable IHS 205 to the docking station. Other types of docking stations may transfer power to an IHS using a dedicated power cord, while using a separate mechanism, whether wired or wireless, for transmitting data between the docking station 260 and the coupled IHS 205. In FIG. 2, however, a single docking cable 215 that connects the docking station 260 and the portable IHS 205 is utilized to transmit data between the docking station and the IHS and is also utilized by the docking station to supply power to the IHS 205.

Also as illustrated in FIG. 2, a docking station 260 may be coupled to an AC adapter 230 that supplies the docking station 260 with a regulated supply of DC power. The docking station 260 uses the received DC power to provide power to portable IHS 205. In some instances, the power supply available to the docking station 260 may limit the power inputs that the docking station may be able to provide to the portable IHS 205 via the docking cable 215. For example, in some scenarios, AC adapter 230 may be a USB-C cable, which may limit the power that may be supplied to the portable IHS 205 by the docking station 260, since a USB-C adapter may be limited to providing no more than 20 volts of power. This inherently limits the power that the docking station may then provide to the portable IHS, where the available power may be reduced based on the docking station using some of this received power for internal operations of the docking station 260, and in some instances to provide power to I/O devices that are coupled to the docking station 260, and in some instances to support wireless power outputs by the docking station.

Accordingly, embodiments support capabilities where docking station 260 receives supplemental power from external display 225, thereby allowing docking station 260 greater flexibility in apportioning available power between its own power demands and supplying power to the portable IHS 205. In most instances, external display 225 is separately powered via its own AC adapter and may operate with a surplus of available power. In some instances, the cabling 225*a* used to connect external display 225 to the docking station 260 may be a USB-C cord, thus supporting both data and power transfers. As described in additional detail below, docking stations 360 according to embodiments may utilize supplemental power inputs received via display coupling 225*a* to power its internal operations and/or to power portable IHS 205.

Figure 3:
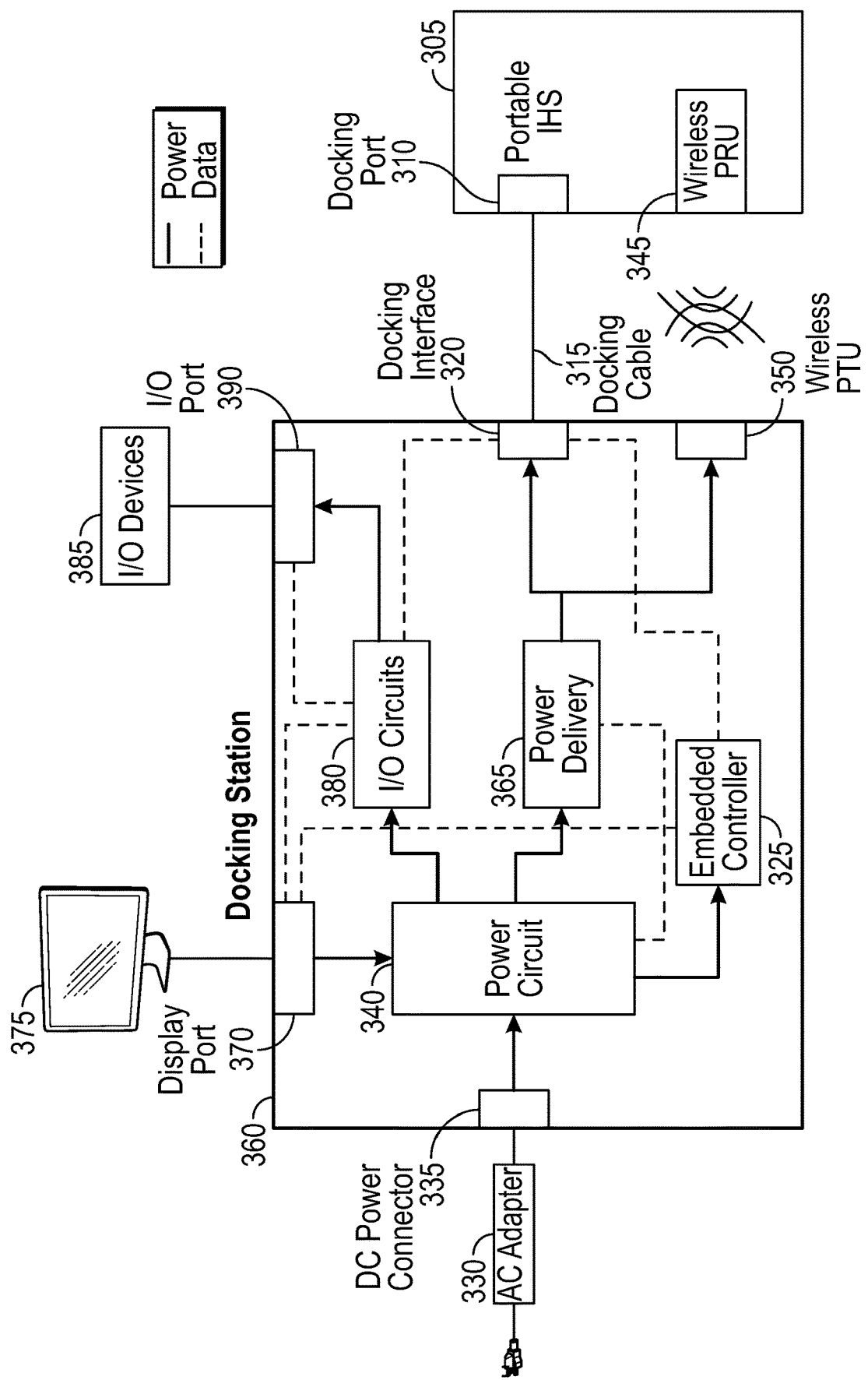
FIG. 3 is a circuit diagram illustrating certain components of a docking station according to embodiments that receives power from an external display that is coupled to the docking station and that may provide power to an IHS using the power received from the external display.

FIG. 3 is a block diagram illustrating certain components of a docking 360 station according to embodiments that receives power from an external display 375 that is coupled to the docking station and that may provide power to a portable IHS 305 using the supplemental power received from the external display 375. In the illustrated embodiment, a portable IHS 305 may be coupled to a docking station 360 via a single docking cable 315 that is received at one end by a docking port 310 of the IHS and received on the other end by a docking interface 320 of the docking station. In certain embodiments, the docking cable 315 may be a USB-C cable that is received by USB-C ports of the portable IHS 305 and of the docking station 360. As described, the docking cable 315 may be used to supply power from the docking station 360 to the portable IHS 305 and may be additionally used to transfer data between the docking station 360 and the portable IHS 305.

In providing power to the portable IHS 305, the docking station 360 may receive external power via an AC adapter 330 that is coupled to a DC power connector 335 supported by the docking station. The external power received from the DC power connector 335 may then be used by the docking station 360 in supplying power to the coupled portable IHS 305, in some instances, via the wired coupling supported by the docking interface 320. In some embodiments, the docking station 360 may supply power to portable IHS 305, and/or other supported devices, via a wireless power transmission unit 350 that interfaces with a wireless power reception unit 345 of the portable IHS 305. Based on the supply of power received from the AC adapter 330, docking station 360 may encounter scenarios where portable IHS 305 could support increased performance levels and/or perform faster charging of internal batteries of the portable IHS 305, if docking station 360 could supply the portable IHS 305 with additional power.

In some embodiments, the power circuit 340 may include a voltage regulator that converts the input DC power received from the DC power connector 335 to a voltage to be supported to the portable IHS 305 by a power delivery circuit 365. For instance, the power delivery circuit 365 may support supply of power to portable IHS 305 according to a USB power delivery specification and thus may be configured to supply industry supported output voltages, such as output voltages of 5V, 9V, 15V and 20V. In addition to supporting power transfers compliant with a protocol such as the USB power delivery specification, docking station 360 may deliver greater levels of power to a portable IHS 305, in some cases limited by the power transfer capabilities of the docking cable 315 and/or wireless power transmission capabilities, and by the surplus power that is available for use by the docking station 360 in supplying power to portable IHS 305. In some docking station embodiments, the power circuit 340 may draw from the output of the voltage regulator that converts the received external power for powering the internal operations of the docking station and in support of I/O operation. However, when an external display capable of supplying supplemental power to the docking station 360 is connected, the voltage regulator may be configured to operate in converting only the received external power from the DC power connector 335 in supplying power to portable IHS 305, while the supplemental power received from the external monitor 375 is used directly by the power circuit 340 to power the internal operations and I/O operations of the docking station 305.

In some embodiments, the voltage regulator of the power circuit may operate to convert a voltage to be supplied to the portable IHS 305 from the aggregation of supplemental power received from the display 375 and the power received from the DC power connector 335. In some embodiments that utilize aggregated power inputs, the voltage regulator may generate a fixed voltage output from the aggregated input, with the single fixed voltage selected for use both in supplying the portable IHS 305 with power and in powering the other operations of the dock station 360. Such embodiments are able to utilize the single voltage output generated from the aggregated inputs to deliver variable amounts of power through the selection of the currents that are drawn by the docking station and by the portable IHS for its own operations. Such embodiments provide these capabilities at a low cost that, when implemented, generate limited amounts of additional heat in comparison to existing docking stations. In support of capabilities for negotiating power delivery, in some embodiments, the voltage regulator of the power circuit 340 may include circuitry supporting the use of aggregated power to generate variable voltages for use in supplying the portable IHS 305 and for use in providing power for the internal operations of the docking station. For instance, the power circuit 340 may include voltage regulation circuitry that can be configured to provide a negotiated voltage for output to the portable IHS and a separate negotiated voltage for use in supporting the operations of the docking station.

As described, in addition to using received external power in order to supply power to portable IHS, existing docking stations must draw power from this received external power in supporting their own operations. In embodiments, on the other hand, a docking station 360 may be configured to power its internal operations using supplemental power provided by external monitor 375, thus allowing all power received from external power supplies 335 to be routed to the portable IHS 305. These internal operations of the docking station 360 may include support for various I/O operations that provide the portable IHS 305 with access to resources coupled to the docking station 360. As illustrated in FIG. 3, a docking station 360 according to some embodiments includes I/O circuits 380 that support the display monitor 375 and the various other user I/O devices 385 that may be coupled to the docking station 360. In addition to consuming external power in supporting these operations by I/O circuits 380, in some instances, docking station 360 may transmit power to certain types of I/O devices 385. For example, a biometric device such as a fingerprint reader that is coupled to docking station 360 via an I/O port 390 may rely on power supplied by docking station 360 in order to operate. Other I/O devices 385 such as wired keyboards and mice may similarly utilize power drawn via a coupling with an I/O port 390 of docking station 360 in order to operate. As a result, significant amounts of power may be required by I/O circuit 380 in supporting the user I/O operations of the docking station 360, separate from the power that is supplied by the docking station 360 to the portable IHS 305.

In supporting I/O operations for portable IHS 305 that are conducted by I/O devices 385, various types of data communications may be conducted between docking station 360 and the portable IHS 305. These data communications between the docking station 360 and the portable IHS 305 include communications used in the operation of the display monitor 375 and in the operation of the other user I/O devices 385. Certain of the data paths of docking station 360 that are used in supporting such I/O operations are illustrated in FIG. 4, in addition to the power pathways that may be utilized by the power circuit 340 in supplying power to I/O devices 385 and to portable IHS 305.

As illustrated in FIG. 3, in certain embodiments, the power received by power circuit 340 may also be utilized in supporting docking station 360 operations by an embedded controller 325 used in implementing the capabilities provided by embodiments. For instance, in some embodiments, embedded controller 325 may execute instructions that are operable for determining whether the portable IHS 305 coupled to the docking interface 320 requires power delivery that is compliant with a USB power delivery protocol, or whether the portable IHS 205 supports greater levels of power inputs that may be provided by the power delivery circuit 365 of the docking station 360. For instance, upon detecting the docking of portable IHS 305 to the docking interface 320, the embedded controller 325 may exchange messages with the portable IHS 305 in order to determine a requested power level that is requested by the portable IHS. For instance, the embedded controller 325 may interrogate the power capabilities of the portable IHS 305 using vendor defined messages supported by the signaling protocol that is used to support the data transmission capabilities of the docking cable 315.

As described in additional detail below, in addition to determining the power demands on the docking station 360 by the portable IHS 305, embedded controller 325 may also be used in determining whether supplemental power is available from external display 375, and also in determining how to apportion the supplemental power between supplying power to portable IHS 305 and supplying power to support the I/O operations of the docking station 360. In some embodiments, embedded controller 325 may interface with external display 375 in order to determine its power delivery capabilities. Based on the supply of external power 330 that is available and the power demands reported by the portable IHS 305, the embedded controller 325 may determine whether to configure power circuit 340 for apportioning the supplemental power from external display 375 strictly for use by the docking station, with external power 330 being routed to portable IHS 305, or whether to aggregate the power from the external display 375 along with the external power 330 for use by the power circuit 340 in apportioning power between operations of the docking station 360 and the portable IHS 305.

Figure 4:
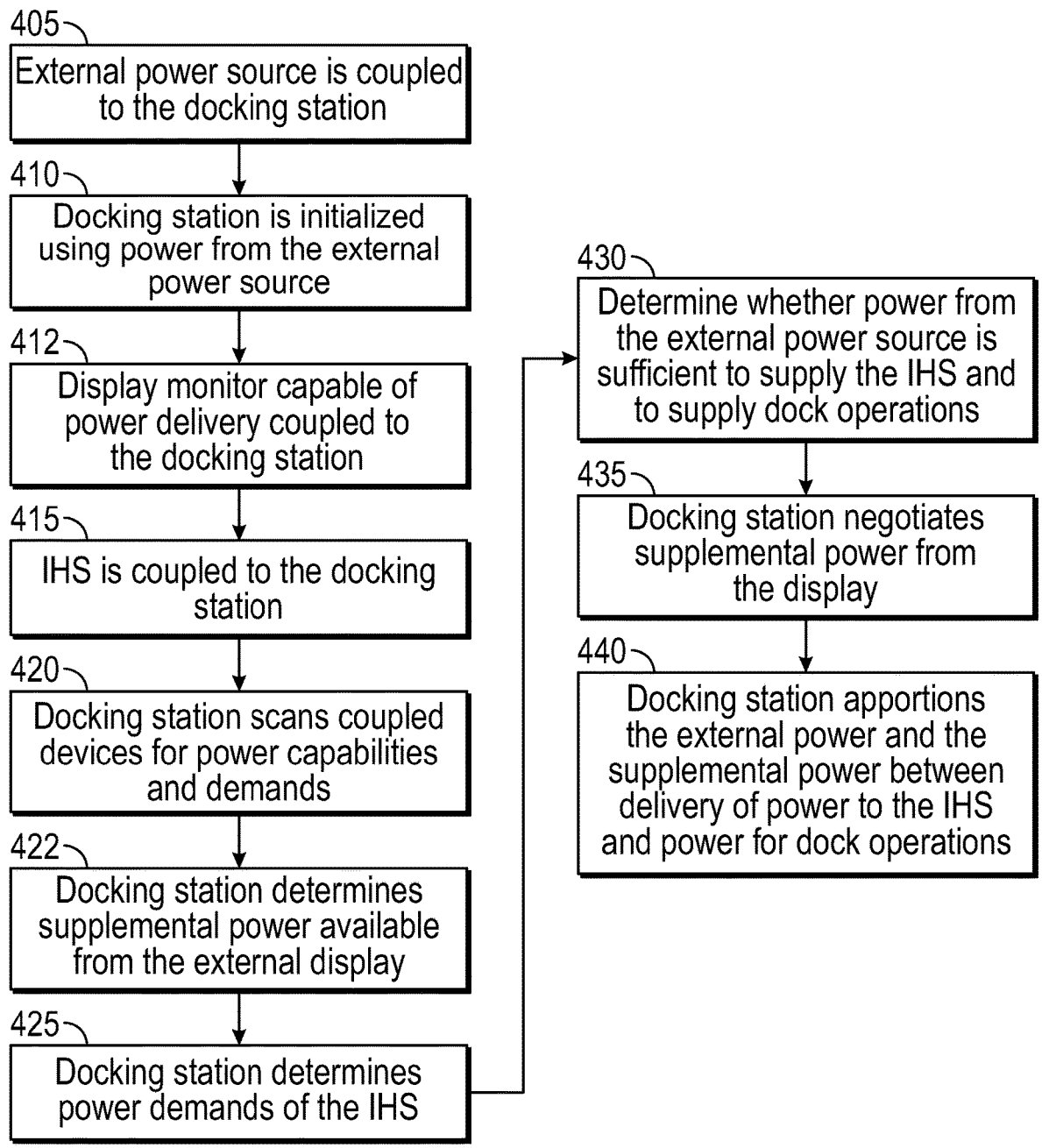
FIG. 4 is a flowchart diagram illustrating certain operations of a docking station according to embodiments that receives power from an external display that is coupled to the docking station and that may provide power to an IHS using the power received from the external display.

FIG. 4 is a flowchart diagram illustrating certain operations of a docking station according to embodiments that receives power from an external display that is coupled to the docking station, and that may provide power to a docked IHS using the power received from the external display that is coupled to the docking station and/or may utilized power received from the external display to power the operations of the docking station. Some embodiments may begin, at block 405, with the coupling of an external power source to the docking station. As described above, an external power source utilized by docking station may include an AC adapter and/or a wireless power transmission unit. The power received from external power sources may then be utilized, at block 410, in the initialization of the docking station.

Upon being powered, or in some cases prior to powering the docking station, at block 412, an external display is coupled to the docking station, where the coupled display is capable of delivering supplemental power to the docking station, such as via a USB-C cable by which the display has been coupled to the docking station. With the external display capable of power delivery coupled to the docking station, at 415, an IHS is coupled to the docking station via the docking interface. Upon initialization and/or upon detecting the coupling of a device to the docking station, an embedded controller of the docking station, such as described with regard to FIG. 3, at 420, may initiate a scan of all coupled devices in order to determine whether any coupled user I/O devices may supply the docking station with supplemental power, and in order to determine the power demands or requests by one or more of the coupled devices, including from portable IHS that has been coupled to the docking station.

As described, in some instances, the external display may be coupled to the docking connected station via a coupling that allows display to supply power to the docking station, such as a USB-C coupling. In such instances, the embedded controller of the docking station may interrogate the external display identified during the scan in order to determine whether the display supports delivery of power to the docking station and the power output levels that are supported by the external display. In some embodiments, such interrogation of the external display may be conducted through operations of an embedded controller of the docking station, such as described with regard to FIG. 3.

In addition to detecting the external display, the scanning operation of the embedded controller may also identify an IHS that has been coupled to the docking port of the docking station. Through communications supported by the docking interface of the IHS, at 425, the docking station determines the power demands (i.e., a request for delivery of power by the docking station) of the coupled IHS. In some instances, the embedded controller of the docking station may issue notifications to the docked IHS that specify power availability by the docking station. The docked IHS may respond with a request for delivery of an available power level to be provided by the docking station. In other instances, the docking station may receive a preemptive request for power delivery from the docked IHS. As described above, the docked IHS may request power delivery according to a protocol, such a power level supported by the USB power delivery specification, or the docked IHS may request greater power levels than are supported by such protocols.

Based on the power demands specified by the docked IHS, at 430, the docking station determines whether the power received from the external power source is sufficient to supply the docked IHS with the power it has requested and also to provide power to fully support the I/O and other operations of docking station. As described, the power required by the docking station to support use of user I/O devices coupled to the docking station and to support other internal operations of the docking station may be significant and reduces the amount of received external power that may be provided to the docked IHS. Accordingly, in many scenarios, the power available from the external power source is insufficient to both support the user I/O operations of the docking station and to provide the docked IHS with all of the power it has requested. Even if sufficient power is provided by the docking station to support the operation of the IHS, the IHS may nonetheless forgo, or at least reduce, use of power received from the docking station in recharging internal batteries of the IHS. In existing docking stations, this power deficit results in reduced power being provided to the docked IHS such that the docked IHS may be forced to operate at a reduced level of performance relative to performance levels that would be attainable if the docking station were able to provide additional power to the docked IHS. In addition to or in alternative to this throttling of the docked IHS, in some existing docking stations, this power deficit may be managed through throttling the operations of the docking station. For instance, existing docking stations may be configured to operate at various different power levels that are selected based on the amount of power that is available aside from what is being provided to the docked IHS.

In scenarios where such a power deficit is identified by the docking station according to embodiments, the embedded controller determines whether supplemental power is available, such as based on the scan identifying the external monitor as a source of power. Accordingly, at 435, the embedded controller of the docking station negotiates a supply of supplemental power from the external monitor. In some embodiments, the amount of supplemental power that is available from the external monitor may be determined through the IHS coupled to the docking station interfacing with the external monitor in order to configure its power utilization. For example, the docked IHS may interface with the external monitor, such as via the I/O paths supported by the docking station of FIG. 3, or via other communication mechanisms, in order to throttle or otherwise limit the power consumption by the external monitor, thus providing additional power. In some embodiments, the docked IHS may configure the external to operate in a limited power state during intervals when the docked IHS is charging its internal batteries.

Based on the availability of power from external display, at 440, the docking station apportions the power that is available, such as through configuration of the power circuit of the docking station by the embedded controller, such as described with regard to FIG. 3. The apportionment by the embedded controller may determine how to allocate the external power received by the docking station and the supplemental power received from the display monitor coupled to the docking station between the delivery of power to the docked IHS and the use of power in support of operations by the docking station. In some embodiments, the docking station may apportion the received external and supplemental power by routing power from the external power supply to the docked IHS and by utilizing the supplemental power from the external display in support of the operations of the docking station. As described above, when configured in this manner, a power circuit of the docking station may utilize the same voltage regulator that is used in existing docking stations in routing power from an external power source to the portable IHS. The power received from the external display may be negotiated to be utilized directly by the power circuit of the docking station in supporting its own operations, including powering the embedded controller, supporting I/O operations and/or providing power outputs to I/O devices coupled to the docking station.

In other embodiments, the embedded controller of the docking station may apportion the available power by aggregating the power received from the external power supply and the supplemental power received the external monitor.

As described above, embodiments may support distribution of aggregated power through a fixed voltage output or by supporting variable voltage outputs. When operating utilizing a fixed output voltage, the power circuit of the docking station generates a fixed voltage output from the aggregated inputs. Such an approach limits the cost required to implement embodiments, while supporting power outputs to the portable IHS that are greater than possible using solely the external power source that is in use by the docking station. The fixed voltage may then be delivered at variable currents to the docked IHS and for use in operations by the docking station. When operating utilizing variable output voltages, the power circuit of the docking station may be configured by the embedded controller to generate one or more negotiated voltage outputs using the aggregated inputs, where the variable voltage outputs may be used to support operations by the docking station and in supply power to the coupled IHS according to a power delivery protocols, such as the USB Power Delivery protocol.

Through such capabilities, docking stations according to embodiments may provide a docked IHS with additional power that can be used support higher performance by the docked IHS and to augment the charging of the internal batteries of the docked IHS. As described above, existing docking stations account for power deficits through throttling the operations of the docking station and/or through throttling of the docked IHS. Though the use of the described embodiments, such throttling by the docking station and/or docked IHS may be eliminated, or at least significantly reduced, while also supporting additional power deliveries to the docked IHS.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A docking station configured for providing power to an Information Handling System (IHS) that is coupled to the docking station and further configured for providing the IHS with access to a plurality of I/O (Input/Output) devices coupled to the docking station, the docking station comprising:
   a power circuit receiving a supply of DC power from an external power source;
   a docking port used by the docking station to supply DC power to the IHS that is coupled to the docking station, wherein the docking port is also used to receive video from the IHS;
   an I/O port receiving a connection from an external display, wherein the I/O port receives a DC power input from the coupled external display, and wherein the I/O port also transmits the video from the IHS for display by the external display; and
   a controller configured to apportion the DC power input received from the coupled external display between operations of the docking station and the DC power supplied to the IHS via the docking port, wherein, based on the apportionment by the controller, only the DC power input received from the coupled external display is used to power operations of the docking station and only the supply of DC power received from the external power source is routed to the IHS via the docking port.

2. The docking station of claim 1, wherein the external power source providing DC power to the power circuit comprises an AC adapter.

3. The docking station of claim 2, wherein the AC adapter comprises a USB-C adapter.

4. The docking station of claim 1, wherein, based on the apportionment by the controller, a portion of the DC power input received from the coupled external display is routed to the IHS via the docking port.

5. The docking station of claim 1, wherein the I/O port comprises a USB-C port.

6. The docking station of claim 1, wherein, based on the apportionment by the controller, the DC power input received from the coupled external display is aggregated with the supply of DC power from an external power source.

7. The docking station of claim 6, wherein, the power circuit uses the aggregated power from the external display and the external power source to generate a fixed voltage output for powering operations of the docking station and in supplying the IHS with power via the docking port.

8. The docking station of claim 6, wherein, the power circuit uses the aggregated power from the external display and the external power source to generate variable voltage outputs for use in powering operations of the docking station and for use in supplying the IHS with power via the docking port.

9. The docking station of claim 1, wherein the apportionment of the power received from external display allows the docking station to supply a negotiated power output to the IHS while operating without throttling its operations.

10. A method for providing power to a first Information Handling System (IHS) that is coupled to a docking station, the method comprising:
   receiving, by the docking station, a supply of DC power from an external power source;
   supplying DC power to the IHS via a docking port by which the IHS is coupled to the docking station;
   receiving video from the IHS via the docking port;
   detecting a connection from an external display at an I/O port of the docking station, wherein the I/O port receives a DC power input from the coupled external display;
   transmitting, via the I/O port, the video received from the IHS to the external display; and
   apportioning, by an embedded controller of the docking station, the DC power input received from the coupled external display between operations of the docking station and the DC power supplied to the IHS via the docking port, wherein, based on the apportionment by the controller, only the DC power input received from the coupled external display is used to power operations of the docking station and only the supply of DC power received from the external power source is routed to the IHS via the docking port.

11. The method of claim 10, wherein the external power source providing DC power to the power circuit comprises an AC adapter.

12. The method of claim 10, wherein, based on the apportionment by the controller, a portion of the DC power input received from the coupled external display is routed to the IHS via the docking port.

13. The method of claim 10, wherein the I/O port comprises a USB-C port.

14. The method of claim 10, wherein the AC adapter comprises a USB-C adapter.

15. A system comprising:
   an Information Handling System (IHS) coupled to a docking station, wherein the IHS is a laptop computer; and
   the docking station configured for providing power to the coupled IHS and further configured for providing the IHS with access to a plurality of I/O (Input/Output) devices coupled to the docking station, the docking station comprising:
      a power circuit receiving a supply of DC power from an external power source;
      a docking port used by the docking station to supply DC power to the IHS that is coupled to the docking station, wherein the docking port is also used to receive video from the IHS;
      an I/O port receiving a connection from an external display, wherein the I/O port receives a DC power input from the coupled external display, and wherein the I/O port also transmits the video from the IHS for display by the external display; and
      a controller configured to apportion the DC power input received from the coupled external display between operations of the docking station and the DC power supplied to the IHS via the docking port, wherein, based on the apportionment by the controller, only the DC power input received from the coupled external display is used to power operations of the docking station and only the supply of DC power received from the external power source is routed to the IHS via the docking port.

16. The system of claim 15, wherein the external power source providing DC power to the power circuit comprises an AC adapter.

17. The system of claim 15, wherein, based on the apportionment by the controller, a portion of the DC power input received from the coupled external display is routed to the IHS via the docking port.

* * * * *